United States Patent
Roberts et al.

[11] Patent Number: 6,166,850
[45] Date of Patent: Dec. 26, 2000

[54] OPTICAL AMPLIFIER GAIN CONTROL

[75] Inventors: Kim Byron Roberts, Nepean; Franz Li Hsien Mok, Kanata; Richard Achile Habel, Ottawa, all of Canada; Nigel Edward Jolley, Bishop's Stortford, United Kingdom

[73] Assignee: Nortel Networks Limited, Montreal, Canada

[21] Appl. No.: 09/185,932

[22] Filed: Nov. 4, 1998

[51] Int. Cl.$^7$ ........................................................ H01S 3/00
[52] U.S. Cl. .......................... 359/341; 359/124; 359/177
[58] Field of Search ................................. 359/341, 124, 359/177

[56] References Cited

U.S. PATENT DOCUMENTS

| | | |
|---|---|---|
| 4,859,018 | 8/1989 | O'Sullivan et al. . |
| 5,247,529 | 9/1993 | Heidemann . |
| 5,274,496 | 12/1993 | Fujiwara et al. . |
| 5,475,529 | 12/1995 | Takatu et al. . |
| 5,506,724 | 4/1996 | Shimizu et al. . |
| 5,680,246 | 10/1997 | Takahashi et al. ............... 359/341 |
| 5,796,505 | 8/1998 | Ushirozawa ..................... 359/160 |
| 5,801,858 | 9/1998 | Roberts et al. . |
| 5,892,616 | 4/1999 | Takahashi ....................... 359/341 |
| 5,923,463 | 7/1999 | Hamada .......................... 359/341 |
| 5,986,799 | 11/1999 | Itou et al. ....................... 359/337 |

FOREIGN PATENT DOCUMENTS

| | | |
|---|---|---|
| 0 828 357 A2 | 8/1997 | European Pat. Off. . |
| 0 849 893 A2 | 11/1997 | European Pat. Off. . |
| 2 292 495 | 8/1994 | United Kingdom . |

*Primary Examiner*—Mark Hellner
*Attorney, Agent, or Firm*—Lee, Mann, Smith, MacWilliams, Sweeney & Ohlson

[57] ABSTRACT

In an optical transmission system employing optical amplifiers a method of regulating the gain of such an amplifier uses a non-linear control system whose non-linearity of operation is provided at least in part by the enabling/disabling of a portion of the control system by the operation of a transient magnitude threshold sensor.

7 Claims, 7 Drawing Sheets

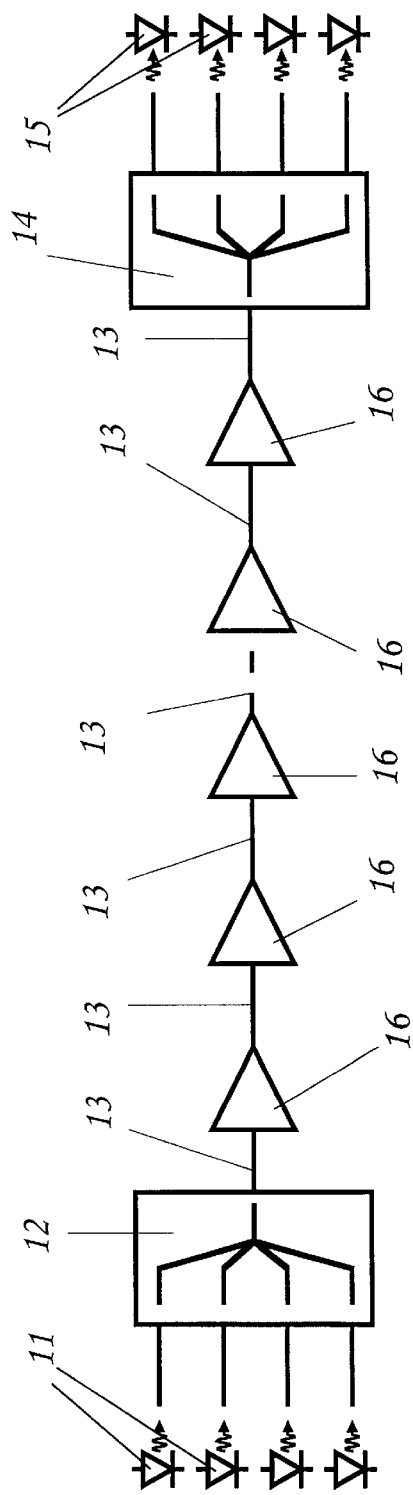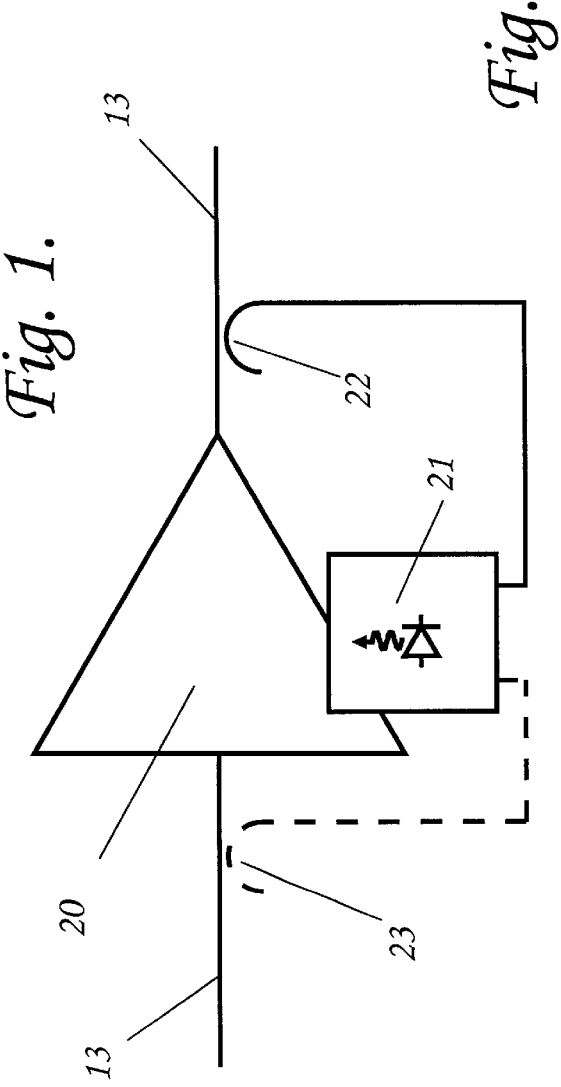

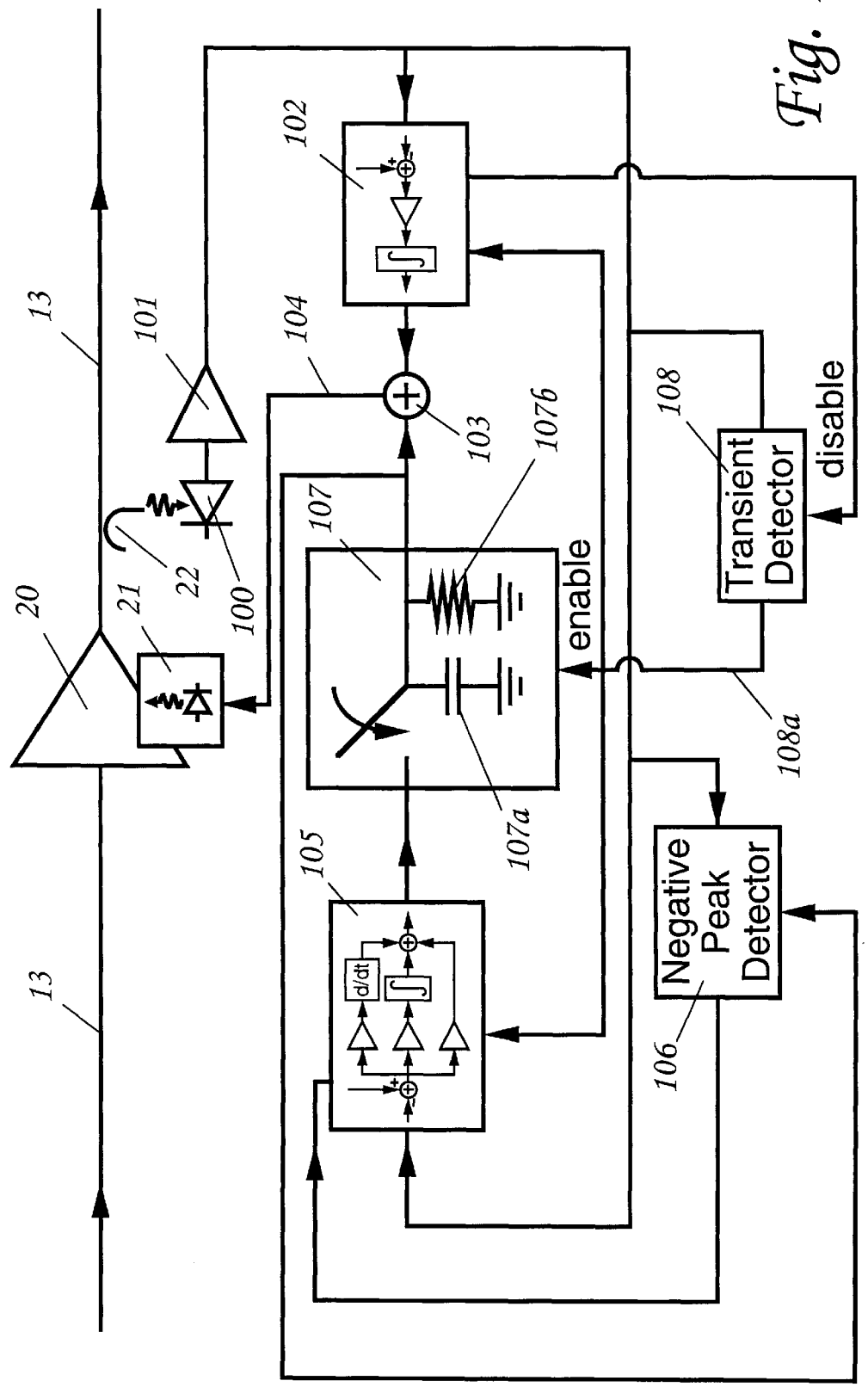

OPTICAL AMPLIFIER GAIN CONTROL

BACKGROUND OF THE INVENTION

This invention is concerned with transients in optical fibre amplifiers.

In an optical transmission system containing one or more optically pumped optical amplifiers in its transmission path from optical transmitter to optical receiver, the occurrence of transients in such amplifiers, such as transients in the power level of the input data signal, can produce artifacts that appears as bit errors at the receiver.

A signal with too high an optical power is subject to non-linear effects in an optical fibre transmission path, such as Self-Phase-Modulation, that can seriously degrade the signal. This causes bit errors or loss of frame in the signal. These non-linear effects are especially severe at bit rates at and above 10 Gbit/s. The onset of the non-linear degradations can be quite sharp, so that only one or two dB of increase in power level can push a signal from optimum performance to a failed state. Conversely, a signal with too low an optical power is subject to noise degradations after suffering further attenuation in the transmission path.

Transients in the power of an optical signal can move that signal away from its optimum power level towards too high or too low a power level. Power margins must be allocated in the design of the transmission system so that, during a worst case transient, in combination with other worst case conditions, the bit error rate remains within specification. In setting the margin, making allowance for these effects of transients reduces the performance that would otherwise be available, performance that could for instance otherwise be used for increasing amplifier spacing.

Even within an appropriate power range, power transients can cause bit errors. These are liable to occur for instance when the transient is faster than the automatic gain control in an amplifier at the receiver, thereby causing a momentary overload of the receive electronics. The consequential distortion produced by such overload can produce bit errors. Moreover, during a transient, the electrical signal, or eye, at the 0,1 decision circuit will be larger, or smaller, than anticipated. This places the decision threshold at the wrong location in the eye, which causes errors.

A further undesirable feature of amplitude transients is that they can produce phase transients in clock recovery circuits and so contribute to jitter, which in turn can increase bit error rate.

Erbium doped fibre amplifiers can cause amplitude transients when used for simultaneously amplifying several wavelengths. Consider the simple example of such an amplifier amplifying two wavelengths. If one wavelength is removed while the amplifier pump is held constant, then the output power at the other wavelength will increase by 3 dB. The speed of this transient is determined by the pump power and by the response of the erbium doped fibre, and is measured in microseconds.

Ways in which the gain of optical amplifiers can be controlled are well known, and examples include U.S. Pat. Nos. 5,274,496 and 5,247,529.

European Patent Application EP 0 828 357 discloses, in respect of an amplifier that is amplifying signals in different signal bands, controlling the pump power in a manner that prevents the output power in any one of these signal bands from exceeding a given threshold. This will operate to remove long-term symptoms of a change in power level, but is generally too slow to suppress the onward transmission of micro-second or milli-second transients.

The onward transmission of transients can be suppressed by providing an optical amplifier with positive feedback to cause it to lase at some wavelength not being used for signal transmission. This clamps the gain of the optical amplifier at the lasing wavelength, and therefore also clamps the gain at all other wavelengths in the gain spectrum. However such an approach requires the provision of significant extra pump power, and this is an undesirable expense. Additionally there is the disadvantage that the gain clamping provides specific values of gain at the signal wavelengths, and these values may not match the needs at that specific amplifier.

At the $22^{nd}$ European Conference on Optical Communications—ECOC '96, Oslo, in a paper (TuD. 1.3) given by R E Tench entitled, 'WDM optical amplifiers—Design and Applications', fast electronic gain control in a two-stage amplifier was described for combating gain shifts resulting from the adding and dropping of signal channels. At the same conference, in a paper (TuD.2.2) given by K Aide et al entitled, 'Bi-directional Repeatered Transmission over 400 Km using Gain Stabilized Linear Repeaters', and also in U.S. Pat. No. 5,475,529, there is described using the level of Amplified Spontaneous Emission (ASE) radiated laterally from the erbium fibre to drive a gain control circuit. In U.S. Pat. No. 5,506,724 there is described a similar approach, but in which it is the longitudinal ASE directed out of the amplifier input that is employed for gain regulation.

The response of an erbium doped amplifier has a pole that moves about the region of 300 Hz to 1 kHz, depending upon the input, output, and pump powers. These powers vary with the specific system application. For a stable control system with a bandwidth in the region of this pole, a zero must be closely matched to the pole. Because the location of the pole varies, especially during an optical transient, a static zero will not closely match the pole. If the bandwidth of the control loop is kept less than the region of this pole then the loop will not respond to fast transients. Classic linear adaptive control methods such as Kalman filtering are not fast enough because the pole moves rapidly during the transient, rather than drifting relatively slowly.

If the bandwidth of the loop is made very large, stability can be obtained, for example by using the inherent pole as the only pole in the loop. This fast loop will respond quickly to transients. However, such a wide bandwidth loop will react strongly to noise or artifacts in the measurement of the gain. Such an artefact can be created by the pattern variation in the data carried by the input signals when passed through the high-pass filtering effect of the optical amplifier.

European Patent Application EP 0 849 893 discloses an approach to the solution of the problem of transients that are liable to occur as the result of switching in or dropping out of one or more wavelength multiplexed signal channels being amplifier by an amplifier. The occurrence of these transients is suppressed by arranging for the power levels in channels being brought into service to be slowly faded in, and similarly for those in channels being taken out of service to be slowly faded out. An optical system can be managed so that all channel additions are predicted, thereby enabling appropriate fade-in provision to be made. The same is of course intrinsically not true in respect of any sudden unpredicted failure of a channel. The disclosure does however describe how to add power in a dummy signal wave length to compensate for such a drop. However that approach is relatively expensive, and uses a potentially valuable portion of the gain spectrum for the dummy signal wavelength which otherwise could have been used for real signal traffic.

Thus there is not a really efficient method known for compensation of sudden power drops where that method allows an optical amplifier to function stably in a realistic range of system applications, and the amplifier does not react excessively to small perturbations.

SUMMARY OF THE INVENTION

An object of the invention is to provide an optical waveguide amplifier that avoids some of the problems of prior art gain control methods in respect of sudden transients in optical power levels being handled by the amplifier.

This is achieved by regulating the gain of such an amplifier using a non-linear control system whose non-linearity of operation is provided at least in part by the enabling/disabling of a portion of the control system by the operation of a transient magnitude threshold sensor.

The control system may include a feed-forward portion that is enable/disabled by the threshold sensor; it may include a feedback portion that is enabled/disabled by the threshold sensor. The control system may include a control loop gain adjustment portion that is enabled/disabled by the threshold sensor.

Other features and advantages of the invention will be readily apparent from the following description of preferred embodiments of the invention, the drawings and the claims.

BRIEF DESCRIPTION OF THE DRAWINGS

FIG. 1 is a generalised diagram of a wavelength multiplexed optical transmission system incorporating optical amplifiers in its transmission path, FIG. 2 is a slightly more detailed diagram of one of the amplifiers of FIG. 1, FIG. 10 is a schematic diagram of circuitry operating to provide non-linear control of the gain of the amplifier of FIG. 2 involving feedback control switched between two feedback control loops possessing different control properties.

DETAILED DESCRIPTION OF PREFERRED EMBODIMENTS

Figure 3:
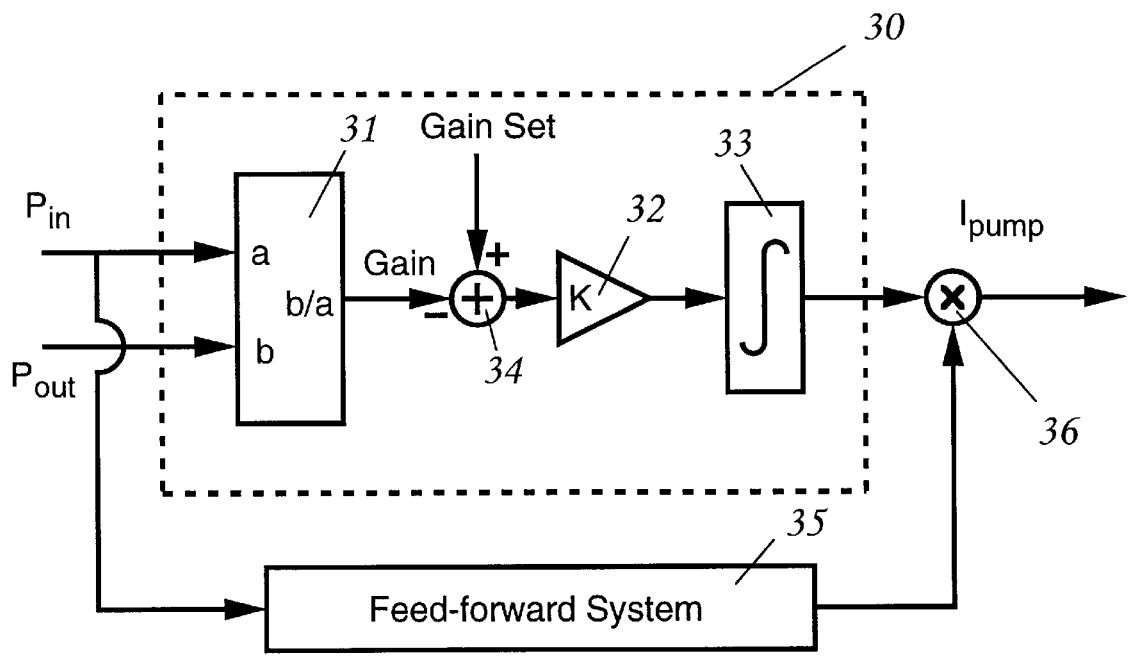
FIG. 3 is a schematic diagram of a circuitry operating to provide non-linear control of the gain of the amplifiers of FIG. 2 using feed-forward gain control.

A schematic of a WDM optical transmission system is depicted in FIG. 1. At the transmitter end of this system, the data modulation outputs of a number of optical sources 11 are combined in some form of wavelength multiplexing device 12, and are launched into a transmission path 13, connecting the transmitter end, of the system to its receiver end. At the receiver end, the wavelength multiplexed data modulated signals are demultiplexed in some form of demultiplexer 14 so that they can be separately detected by detectors 15. At spaced intervals along the transmission path 13 are located optically pumped optical waveguide optical amplifiers 16. A slightly more detailed schematic of one of the amplifier 16 of FIG. 1 is depicted in FIG. 2. In FIG. 2 the gain medium of the amplifier is schematically depicted at 20, and its optical pump at 21. Regulation of the operation of the pump 21 is performed under the control of an input signal taken from an optical tap 22 which taps a specific fraction of the optical signal power output delivered by the gain medium 20. Additional control may be provided by a further input signal taken from a further optical tap 23 which taps a specific fraction of the optical signal power delivered to the gain medium 20.

Attention is now turned to an example of non-linear control of the gain of an optical amplifier by non-linear switched regulation of the drive current applied for the optical pumping of that amplifier. In this example a conventional control loop system provides primary regulation of the drive current in response to a control signal input representative of the optical signal power received from amplification by the amplifier. Operation of this control loop is supplemented by a switched feed-forward pathway which operates to compensate for the effects of sudden significant negative transients in the level of received optical signal power. The components of the drive current regulation system are schematically depicted in FIG. 3. In this Figure the components of a conventional control loop system are depicted within the broken line rectangle 30. This Figure, and succeeding Figures, show in schematic form functional features which can be implemented in practice by operation of a conventional microprocessor. The gain control system 30 of FIG. 3 receives an input $P_{in}$ that is derived from the output taken by tap 23, and so is representative of the optical signal power received for amplification by the amplifier.

The gain control system similarly receives an input $P_{out}$ that is derived from the output taken from tap 22, and so is representative of the optical signal power output of the amplifier. These two signals are fed to a ratio meter 31 to provide an output representative of the instantaneous optical gain of the optical amplifier 16. This value is fed to an electrical amplifier 32 and on to an integrator 33. The output of the integrator 33 regulates the optical power output of the pump. In the case of a laser diode pump, the regulation is applied as a regulation of the pump laser diode drive current $I_{pump}$. The specific mean value of optical gain provided by the optical amplifier can be set to a specific value by an input shown as being applied to a summer 34 that is inserted between the ratio meter 31 and the electrical amplifier 32. The input to this summer from the ratio meter has been afforded a minus sign because, for stability of operation, the feedback control must operate in such a way that an increase in the measured value of instantaneous gain should operate to produce a reduction in the magnitude of the pump laser diode drive current $I_{pump}$. Additional to the components of a conventional gain control system 30, the control system contains a feed-forward block 35 that processes a signal taken from the input $P_{in}$ to provide a signal applied to a multiplier 36 inserted in the output from the system 30.

Figure 4:
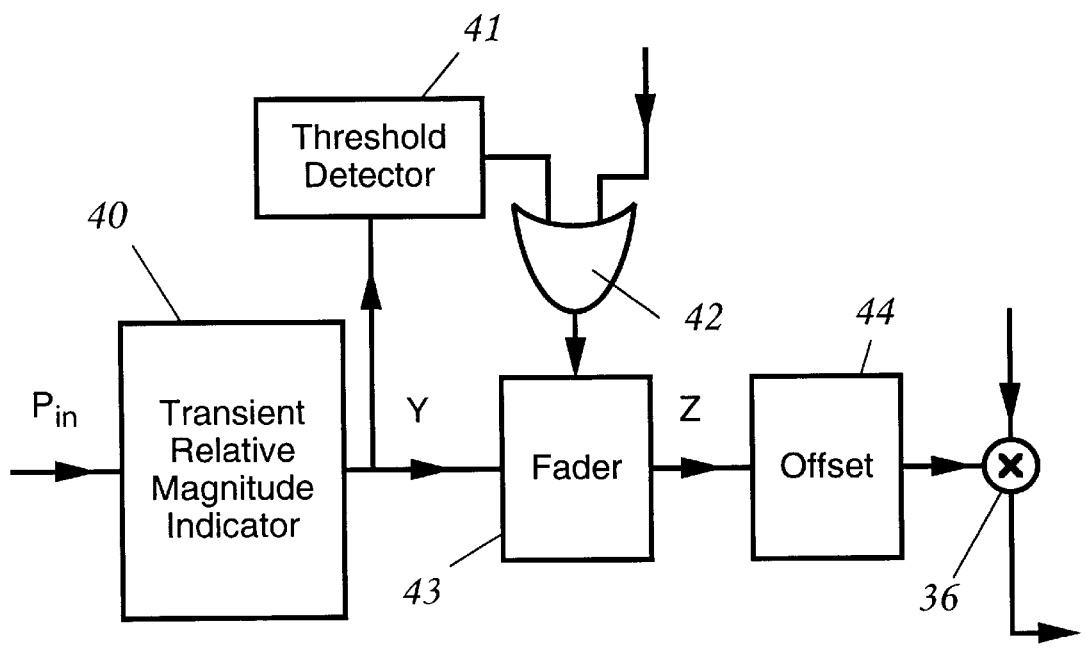
FIG. 4 is a slightly more detailed schematic diagram of the functional components of the feed-forward circuitry of FIG. 3, FIGS. 5, 6 and 7 depict in further schematic detail the functional details of components depicted in FIG. 4.

The basic functional components of the feed-forward block 35 are depicted in FIG. 4, and comprise a transient relative magnitude indicator 40, a threshold detector 41, a fader 43 and an offset control device 44. The transient relative magnitude indicator compares the instantaneous value of $P_{in}$ with a mean (time-averaged) value $X_{av}$ to provide an output Y. Only when the value of Y drops beneath a certain threshold, i.e. only in the presence of a negative transient of sufficient magnitude, does the threshold detector 41 enable the fader 43 to transmit this input Y as output Z to the input of the offset control device 44. This offset control 44 provides an offset value, $\Delta$, for adding to the output of the fader to enable compensation, for instance compensation for the proportion of amplified spontaneous emission (ASE) expected to be present in the output of the optical amplifier. This offset value, $\Delta$, can be constant, or advantageously is actively set by the microprocessor from a direct measurement of the ASE actually being generated by the optical amplifier. At the termination of a transient that exceeds the threshold, the threshold detector 41 switches off the feed-forward function of the fader 43. When this happens, the fader operates to cause the value of Z output by it to rise in a controlled way asymptotically towards a fixed value $V_o$. The time constant of this rate of rise is matched with the time constant of the control system 30. The connection from the threshold detector 41 to the control input of the fader 43 has been depicted as being by way of an OR gate 42 function provided for enabling the microprocessor to override the control of the fader exercised by the threshold detector. This overriding may be required for instance during power-up or changing the input transimpedance.

Figure 5:
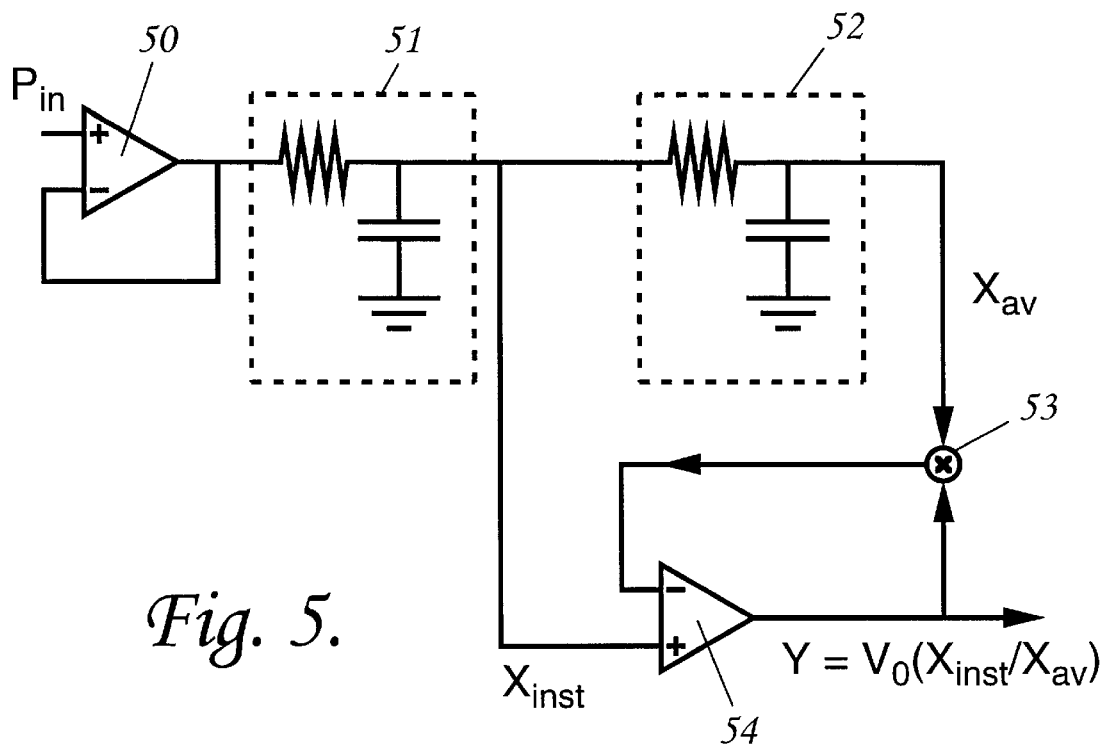

An example of a functional way in which the transient relative magnitude indicator 40 can be implemented is depicted in FIG. 5. An input taken from $P_{in}$ is passed through an isolation buffer 50, and then through a low-pass filter which controls the slew rate of this feed-forward system. For a particular system this slew rate value is chosen as a compromise between noise filtering and deglitching on the one hand, and response speed and degree of suppression on the other hand. The output from this low pass filter 51 has a value $X_{inst}$ related to the instantaneous value of the optical power input $P_{in}$ to the amplifier. This value $X_{inst}$ is applied to a second low-pass filter 52 which has a much longer time constant (typically about 20 ms) in order to produce a time-averaged value $X_{av}$. The time constant of low-pass filter 52 is designed to match that of the amplifier control loop 30. It can be a fixed value, but advantageously the microprocessor is arranged to make the time constant of the filter 52 dynamically track that of the control loop 30 (or that of the control loop dynamically track that of the filter 52). A signal proportional to the ratio of $X_{inst}$ to $X_{av}$ is produced by a divide circuit represented by a multiplier 53 and a differential amplifier 54. The multiplier 53 receives inputs from the low pass filter 52 and from the output of the differential amplifier 54, and provides an output applied to one input of the amplifier 54. The other input to amplifier 54 is taken from the output of the low-pass filter 51. Accordingly the voltage value at the output of amplifier 54 is Y, where $Y = V_o (X_{inst}/X_{av})$.

Figure 6:
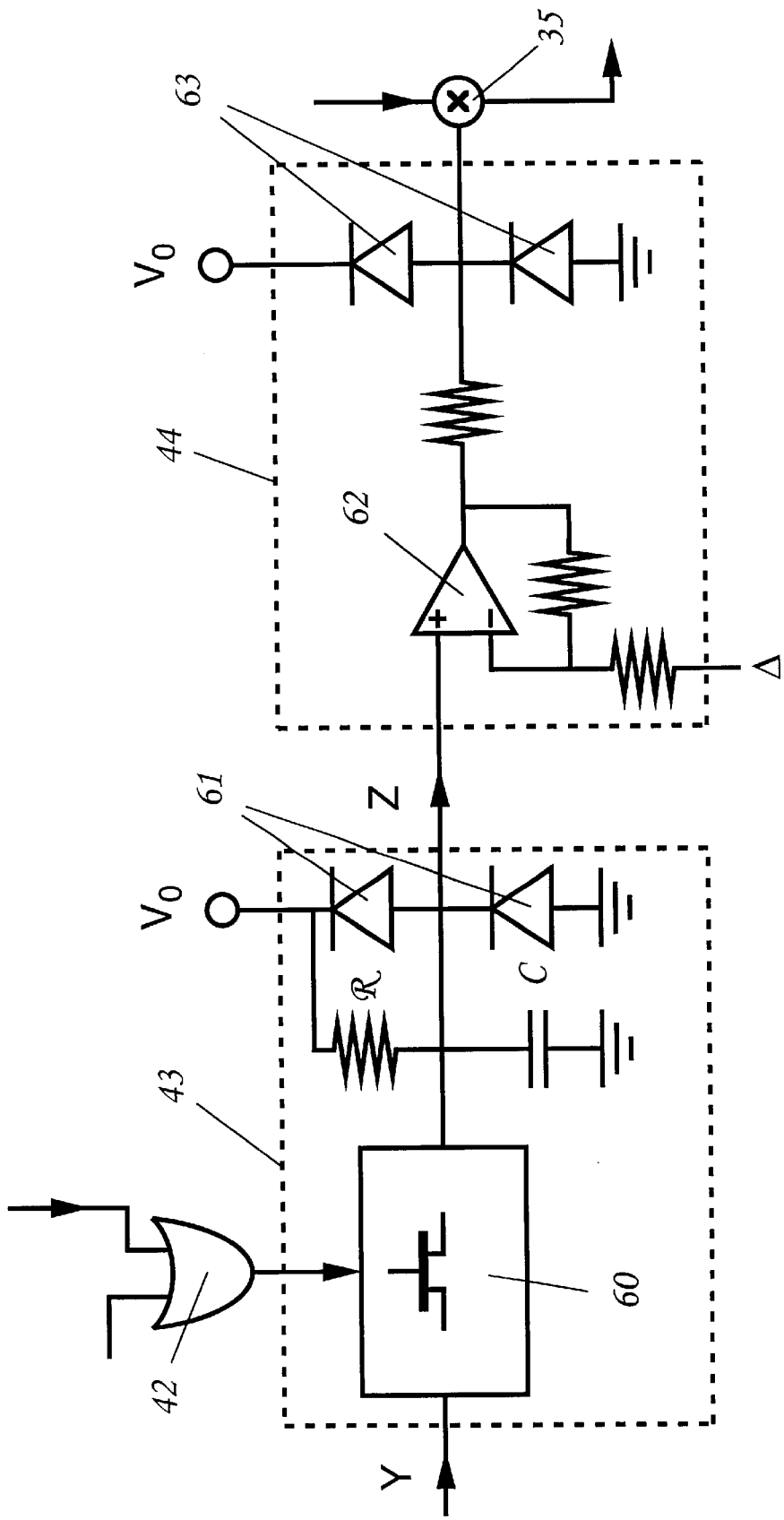

FIG. 6 depicts the functional structure of the fader 43 and offset control device 44 of FIG. 4. In respect of the fader 43, the output Y of the transient relative magnitude indicator 40 (of FIG. 4) is fed to a switch 60 operated by the OR gate 42. In the presence of an output from the OR gate 22, the switch 60 forwards the output to a pair of diodes 61 which serve to clamp the value of that output between 0 and $V_o$. The removal of an output from the OR gate 22 operates to activate the switch 60 so as to isolate its output from its input. At this juncture the pre-existing voltage, lying between 0 and $V_o$, appearing on capacitor C discharges through resistor R. Accordingly the output Z of the fader is raised asymptotically to the value $V_o$ with a time constant determined by the values R and C. In the offset control device the output value Z is offset by a value $\Delta$ by means of amplifier 62, and the resultant is clamped to a value lying between 0 and $V_o$ by a further pair of diodes 63 before being applied to the multiplier 35.

Figure 7:
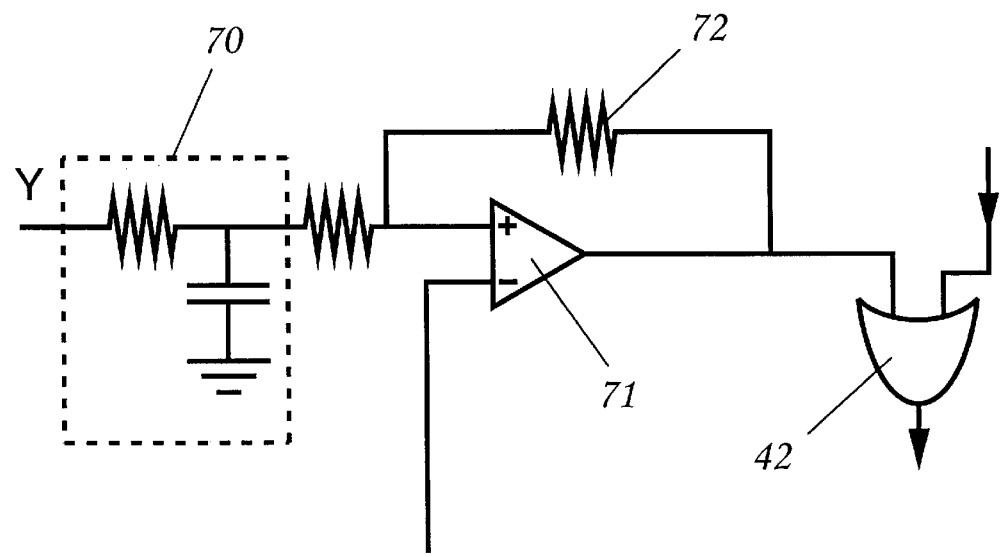

FIG. 7 depicts the functional structure of the threshold detector 41. An input Y is taken from the output of the transient relative magnitude indicator 40 and is passed via a low-pass filter 70 to a differential amplifier 71 where it is compared with an input $V_o-A$, where A is the value of the activation threshold that inhibits operation of the feed-forward function to those times during which the threshold is exceeded. Output of the differential amplifier 71 is applied to one input of the OR gate 42. Optionally hysteresis of operation is provided by means of a resistor 72 connected in a feedback path of the differential amplifier 71.

Even with the feed-forward circuit, it can be still advantageous to push the bandwidth of the gain control loop into the region of the inherent pole. In either digital or analog implementations, the impediment to stable operation over all operating conditions is the movement of the location of that pole in the amplifier response.

The position of the pole can be predicted from the input, output, and pump powers for a particular amplifier. To obtain the required speed, the pole location is measured or calculated in advance, and stored in a table in the microprocessor's non-volatile storage. The location of the pole-cancelling zero is adjusted within the control loop that maintains the optical amplifier gain.

The design of the feed-forward block 35 described above with particular reference to FIGS. 4 to 7 is one specifically designed to handle sudden negative transients. The provision of such protection is typically of more importance than that for handling positive transients because it is possible to guard against the occurrence of positive transients by ensuring that, whenever an additional optical data channel is brought on line, its power level is ramped up sufficiently slowly having regard to the response time of the control system 30. Nevertheless, if protection against the effects of sudden positive transients is additionally desired, such protection can be provided in a way similar to that described above in relation to the handling of negative transients.

Attention is now turned to an example of a different form of non-linear control of the gain of an optical amplifier. This also involves regulation of the drive current applied for optical pumping of the amplifier, but in this instance the switched non-linearity of operation is provided by switching the bandwidth of the control loop system regulating the drive current in response to the control signal input representative of the optical signal power received for amplification by the amplifier. The bandwidth is switched between a high value in the presence of sudden transients (this high value being high enough to provide a rapid response to these transients), and a lower value in the absence of such transients (this low value being such as to maintain substantial noise and artefact filtering together with stability of operation during substantially steady state operating conditions of the amplifier).

Figure 8:
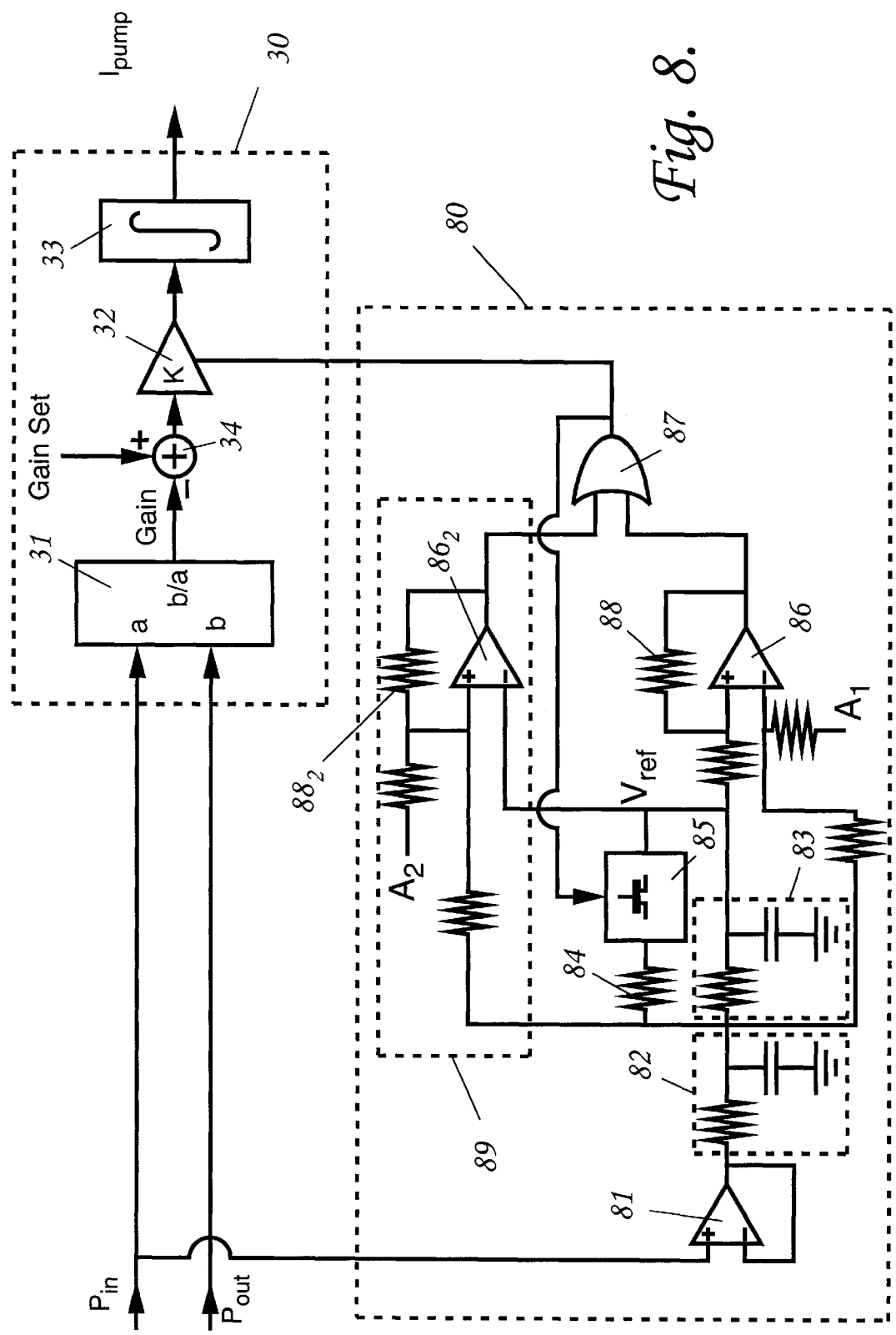
FIG. 8 is a schematic diagram of circuitry operating to provide non-linear control of the gain of the amplifier of FIG. 2 using switching of the bandwidth of a control loop regulating the operation of an optical pump pumping the amplifier.

Referring to FIG. 8, this non-linear control employs substantially the same functionality of control loop 30 as the non-linear control of FIG. 3 but omits the feed-forward block 35, substituting for it a trigger whose basic functional components are indicated within the broken line rectangle 80. These components include an isolation buffer 81 and low pass noise filter 82, a second low pass filter 83 with a longer time constant, a parallel resistor 84 which can be switched in, under the control of a gate 85, to shorten the time constant of filter 83. The outputs of filters 82 and 83 are fed, together with an activation threshold $A_1$, to a differential amplifier 86 whose output provides an input to an OR gate 87, the time constant of filter 83 is matched with the response of the control loop 30 when operating under steady state conditions. This can be a constant set to the nominal response of the control loop. Advantageously, either the low-pass filter corner frequency or the control loop gain is adjusted by the microprocessor to keep a close match despite variations occurring in the optical amplifier operating conditions. The filter 83 therefore provides, to the amplifier 86, an input $V_{ref}$ that is representative of the mean level of optical power input $P_{in}$, while the filter 82 provides an input representative of the instantaneous value of $P_{in}$. In the presence of a sudden negative transient of sufficient magnitude as determined by the activation threshold $A_1$, the amplifier provides an output which is transmitted by the OR gate 87 to switch the gain K of the amplifier 32 of control loop 30 to a higher value, so triggering that control loop into a wide-band mode. At the same time the output from the OR gate 87 is also employed to operate the gate 85 so as to bring about a matching change to the time constant of filter 83 by the shunting effect of resistor 84. A feedback resistor 88 across the amplifier 86 provides a measure of hysteresis of operation. At the end of the negative transient, the input to the OR gate 87 is removed, with the result that the control loop 30 and trigger 80 are restored to their former steady state operating conditions. Provision for responding to positive transients may be provided by adding the functionality of the components within the broken line rectangle 89, these components comprising a second amplifier $86_2$ and hysteresis resistor $88_2$, and a second activation threshold $A_2$.

The non-linear feed-forward control of FIG. 2 can be applied to optical transmission systems employing bidirectional optical amplifiers such as described in U.S. Pat. No. 5,801,858. It should be noted however that the operation of such feed-forward control in a bidirectional amplifier is liable to be adversely affected by reflection of optical power output from such an amplifier back into itself because such reflections can be at power levels comparable with those of the input signals that it is intended that that amplifier shall amplify. These reflections have both a DC effect and an AC effect. The DC effect is to distort the evaluation of the transient relative magnitude. The AC effect results when a transient in the input signal power in respect of a signal propagating in one direction is completely suppressed in its transmission through the amplifier, is partially reflected, and the partially reflected light re-enters the amplifier as a spurious transient superimposed on the wanted signal propagating in the opposite direction. One way of suppressing such unwanted effects will now be described with reference to FIG. 9.

Figure 9:
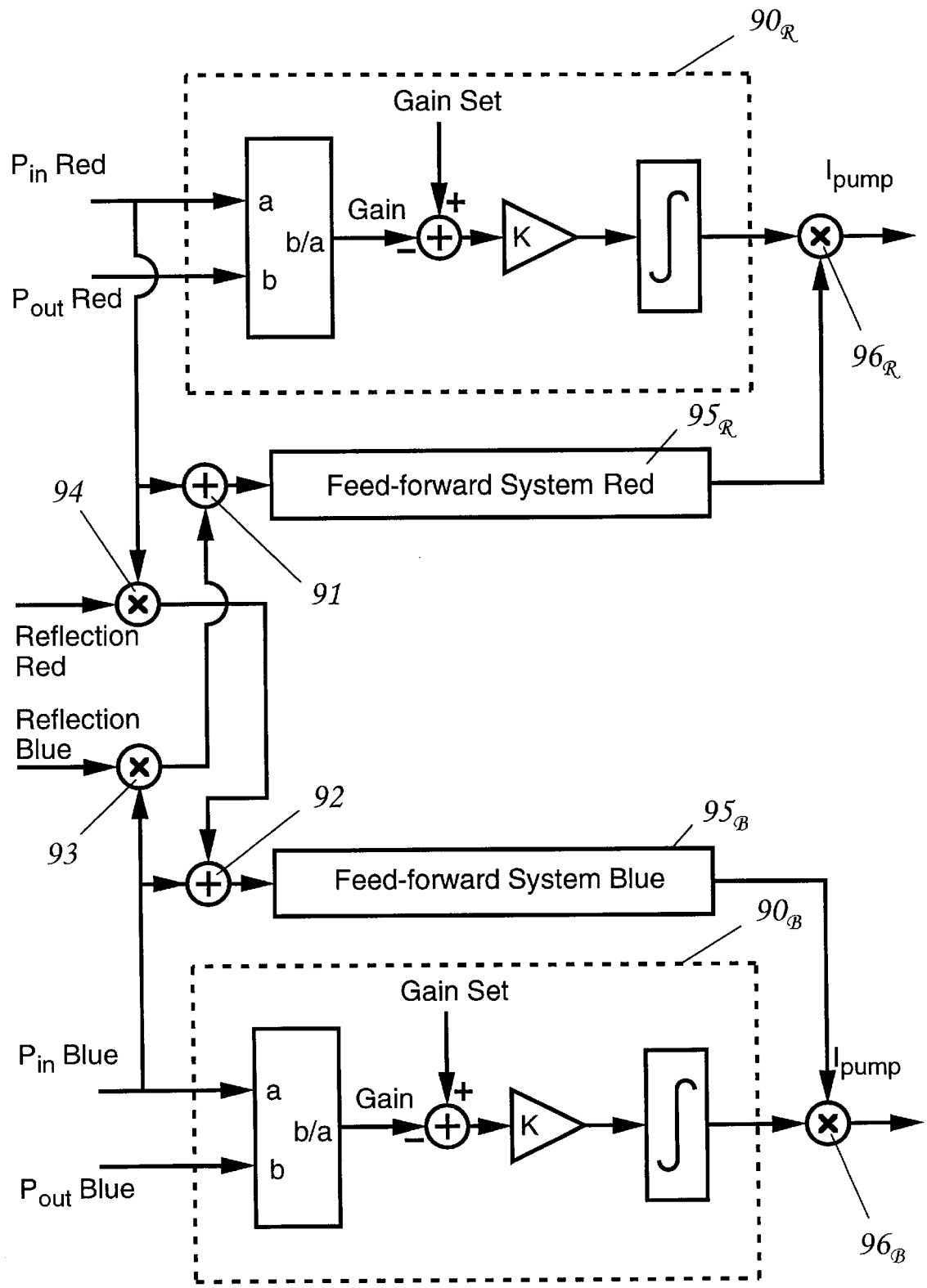
FIG. 9 is a schematic diagram illustrating how the feed-forward gain control of FIG. 2 may be adapted for use in a transmission system employing bidirectional optical amplifiers.

The arrangement of FIG. 9 is in respect of a system in which the signals propagating in one direction are all signals at wavelengths longer than those of signals propagating in the other direction, and so the two directions of propagation are respectively referred to hereafter as the red direction and the blue direction. This FIG. 9 similarly shows in schematic form features which are conveniently in practice by operation of a conventional microprocessor. The gain control system of FIG. 9 is formed in two parts, one providing red direction gain control, and the other blue direction gain control. Each of these parts operates in a similar manner to that described above with reference to FIG. 3. Thus each has a feed-back control system $90_R$, $90_B$, in parallel with a feed-forward control system $95_R$, $95_B$, corresponding respectively with the feed-back and feed-forward control systems 30 and 35 of FIG. 3. Similarly, the outputs of the feed-back and feed-forward control systems $90_R$, and $95_R$, and $90_B$, and $95_B$, are applied to respective multipliers $96_R$, and $96_B$, to provide respective pump laser diode drive currents. $I_{pump}$ Red and $I_{pump}$ Blue. In this instance, however, the input power signals $P_{in}$ Red and $P_{in}$ Blue are not applied direct to the inputs of the feed-forward control systems $90_R$ and $90_B$, but are applied via summers 91 and 92. The second inputs, negative inputs, to these summers 91 and 92 are provided by the outputs of two multipliers 93 and 94. The inputs to multiplier 94 are respectively $P_{in}$ Red and Reflection Blue, while those of multiplier 93 are $P_{in}$ Blue and Reflection Red. Reflection Red and Reflection Blue are signals generated by the microprocessor using the reflectometer features disclosed in U.S. Pat. No. 4,859,018, or the reflectolocator feature disclosed in United Kingdom Patent No 2 292 495 to determine the static levels of red and blue direction reflections at a given output. The microprocessor generates two DIA voltages: 'Reflection Red' and 'Reflection Blue' that are proportional to the measured reflection, to the optical amplifier gain setting, and to the relative transimpedance gain settings of the two input monitors. All of these parameters are known to the microprocessor, and are digitally multiplied and then scaled to the D/A. These two reflection voltages each multiply the input monitor values in multipliers 94 and 93. Each product is then subtracted from the opposite transient input in the summers 91 and 92, this conveniently being effected at the isolation buffers of the feed-forward systems 95$_R$ and 95$_B$. This compensates for the DC effect of the reflection, and for the transient effect of reflection of signals containing transients. Inputs are used for subtraction, rather than the outputs to avoid all analog cross-coupling and the resultant stability issues. The digital cross-coupling path, via two reflections and reflection measurements, always has a gain much less than unity because the reflectometer update rate is very slow. The high pass filter inherent in the V$_{ref}$ comparison, and the heavy low pass filtering on the D/A Reflection outputs (not shown in the diagram), ensure high loss around the path at low frequencies. The low pass filtering on the outputs serves to prevent nonlinear transient generation via a step change in the D/A value. (This can be effected in either analog or digital mode).

Attention is now turned to an example of a further form of non-linear control of the gain of an optical amplifier. This form involves regulation of the power output of an optical pump pumping the amplifier in a feedback manner using a feedback control signal derived from a measure of optical power output by the optical amplifier. The feedback control involves the use of two feedback loops, one of which is operational only when transients of a certain magnitude are present, and the other of which is operational only when they are absent. By obtaining the feedback control signal from the output power of the optical amplifier, the amplifier gain tilt does not affect the accuracy with which the magnitude of transients are determined, while the feedback nature of the control structure in general provides more accurate control.

The general structure of this feedback gain transient suppression mechanism is depicted in FIG. 10. The two feedback control loops can each be implemented in a microprocessor, or in hardware if a faster control response is desired. FIG. 10 depicts the optical amplifier 20 inserted in the transmission path 13. The optical pump for the amplifier 20 is depicted at 21. A proportion of the optical output of amplifier 20 is tapped off by optical tap 22 and fed to a monitor photodiode 100 whose output is fed to an amplifier 101. The output of this amplifier 101 is fed to an output power controller 102 that in normal operation provides an output which is fed through a summing device 103 on to a control line 104 that regulates the optical output of pump 21. This completes the output power feedback control loop. The basic components of the controller 102 of the control loop are similar to those of the controller 30 of FIG. 3, except for the omission of the ratio meter 31 of the FIG. 3 controller.

The output of the monitor photodiode output amplifier 101 is also fed to a further controller 105, the gain transient controller, similar to controller 102, but receiving its target input from the output of a negative peak detector 106. The output of the gain transient controller 105 is fed through a gain transient control enable/disable switch 107, through the summing device 103 on to the control line 104, thereby completing the transient feedback control loop.

Additionally the output of the monitor photodiode output amplifier 101 is fed to the input of the negative peak detector 106 and to a transient detector 108. This transient detector 108 can for instance be implemented in a manner similar to the implementation of the transient relative magnitude indicator and threshold detector combination 40 and 41 of FIG. 4. It can alternatively for instance be implemented in a manner similar to that employed in the arrangement of FIG. 8 in which the outputs of two low pass filters 82 and 83 with different time constants are compared using a differential amplifier 86.

The detection and suppression of transients can be accomplished by making use of the fact that in the event of a sudden uncompensated negative transient, arising for instance from the sudden removal of one or more of a group of wavelength multiplexed signals received by the optical amplifier, the total power output of the amplifier drops to the power level of the surviving channels, before increasing again to the original output power level existing prior to the onset of the transient.

At the onset of such a transient, the sudden reduction in optical output power issuing from the amplifier 20 produces a corresponding reduction in signal from the output of the monitor photodiode amplifier 101. If this is large and fast enough, it triggers operation of the transient detector 108 to provide an output on an enable/disable line 108a. This line is connected to the switch 107 and to both controllers 102 and 105. A signal on line 108a disables output power controller 102, holding constant its output at the summer 103. It closes switch 107, and enables the gain transient controller 105, so that the controller's output is now connected to summer 103. The open loop transfer function of controller 105 is typically a PID (proportional plus integral plus derivative) function with control parameters chosen to ensure adequate suppression speed and desired stability margins over the required operating conditions. The gain transient controller 105 responds much faster than controller 102. Using the output of the negative peak detector 106 as the target of controller 105 ensures an adequately smooth transition from the operation of the feedback control loop incorporating the power output controller 102 to the operation of the loop incorporating the gain transient controller 105.

The appearance of the signal appearing on line 108a also triggers the starting of two timers (not shown), the first of which regulates the duration for which the feedback control loop incorporating the gain transient controller 105 is to remain operative, and the second of which regulates the duration for which the feedback control loop incorporating the power output controller is to remain inoperative. The duration set by the second timer is longer than that set by the first. The duration set by the first timer is set to be longer than the largest possible transient time so that the gain transient controller 105 shall not be disabled until after such a transient has passed. When the first timer has run its course, the gain transient controller 105 is disabled and the switch 107 is opened. A substantially smooth transition between the ceasing of operation of the feedback control loop incorporating the gain transient controller 105, and the recommencement, when the second timer has run its course, of the operation of the feedback loop incorporating the power output controller 102, is provided by the time constant of the decay of charge appearing on a capacitor 107a through a resistor 107b.

Preferably the construction of the two feedback control loops is such that the power output controller 102 acts as a master to the gain transient controller 105 so that gain transient detection, and hence compensation, can be disabled in the event of unfavourable operating conditions such as optical amplifier start up, changes to transimpedance amplifier gain setting, amplifier oscillation and the like.

What is claimed is:

1. An optically pumped optical waveguide amplifier whose gain is maintained and regulated by a non-linear control system whose non-linearity of operation is provided at least in part by the enabling/disabling of a portion of the control system by the operation of a transient threshold sensor.

2. An amplifier as claimed in claim 1, wherein the control system includes a feed-forward portion that is enabled/disabled by the operation of the transient threshold sensor.

3. An optically pumped optical waveguide amplifier whose gain is maintained and regulated by a non-linear control system whose non-linearity of operation is provided at least in part by the enabling/disabling of a portion of the control system by the operation of a transient threshold sensor, wherein the control system includes a feed-forward portion that is enabled/disabled by the operation of the transient threshold sensor, wherein the feed-forward portion, when enabled, provides an output that scales an output from another portion of the control system, said feed-forward portion having a response feed fast compared with that of said other portion, and wherein said feed-forward portion includes disengagement means which operates, upon disablement of the feed-forward portion, to fade its output at a rate matched with the response speed of said other portion.

4. An optically pumped optical waveguide amplifier whose gain is maintained and regulated by a non-linear control system whose non-linearity of operation is provided at least in part by the enabling/disabling of a portion of the control system by the operation of a transient threshold sensor, wherein the control system includes a feed-forward portion that is enabled/disabled by the operation of the transient threshold sensor, wherein said amplifier is a bidirectional amplifier, wherein the non-linear control system has a first gain control portion regulating the amplifier gain for signal traffic propagating in one direction through the amplifier, and a second gain control portion regulating the amplifier gain for signal traffic propagating in the opposite direction through the amplifier, wherein the transient threshold sensor has a first transient sensing portion responsive to transients in forward propagation signal traffic propagating in said one direction and to a reflected component, reflected back into the amplifier, of signal traffic propagating in said opposite direction, and has a second transient sensing portion responsive to transients in forward propagation signal traffic propagating in said opposite direction and to a reflected component, reflected back into the amplifier, of signal traffic propagating in said one direction.

5. An amplifier as claimed in claim 1, wherein the control system includes a feedback portion that is enabled/disabled by the operation of the transient threshold sensor.

6. An amplifier as claimed in claim 1, wherein the control system includes a control loop gain adjustment portion that is enabled/disabled by the operation of the transient threshold sensor.

7. An optical transmission system including optical transmission path including a plurality of optical amplifiers as claimed in claim 1.

* * * * *